Oct. 1, 1968  O. L. HOLCOMB, JR  3,403,759
DISC ELEMENT CONSTRUCTION FOR DISC BRAKE
Filed Feb. 13, 1967  6 Sheets-Sheet 2
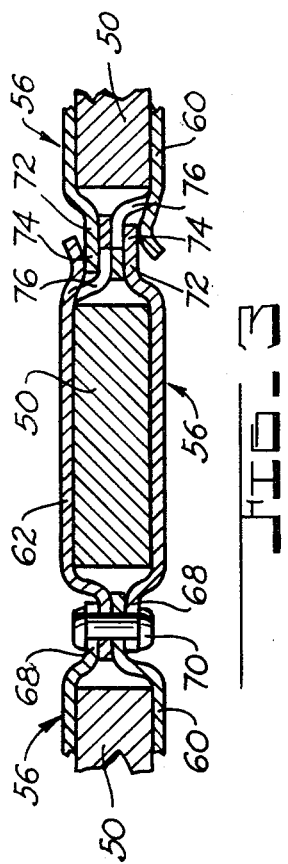
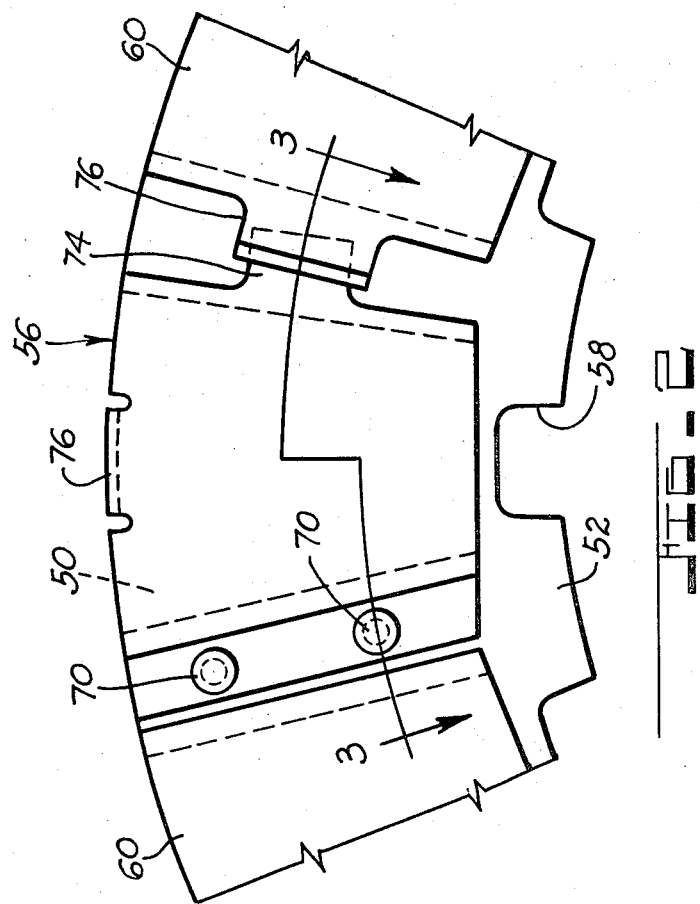
INVENTOR.
ORLA L. HOLCOMB JR.
BY
William N. Antonie
ATTORNEY.

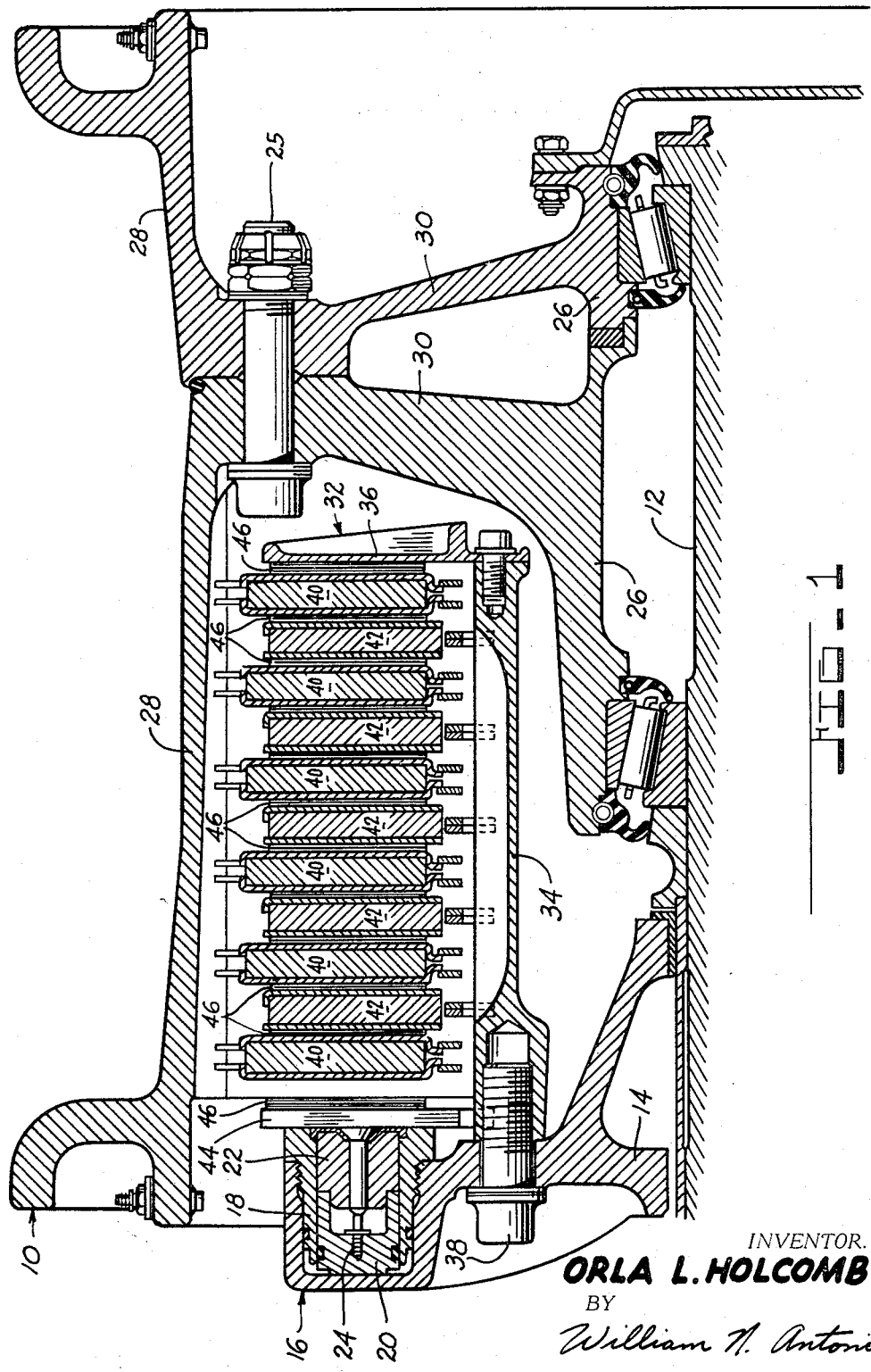

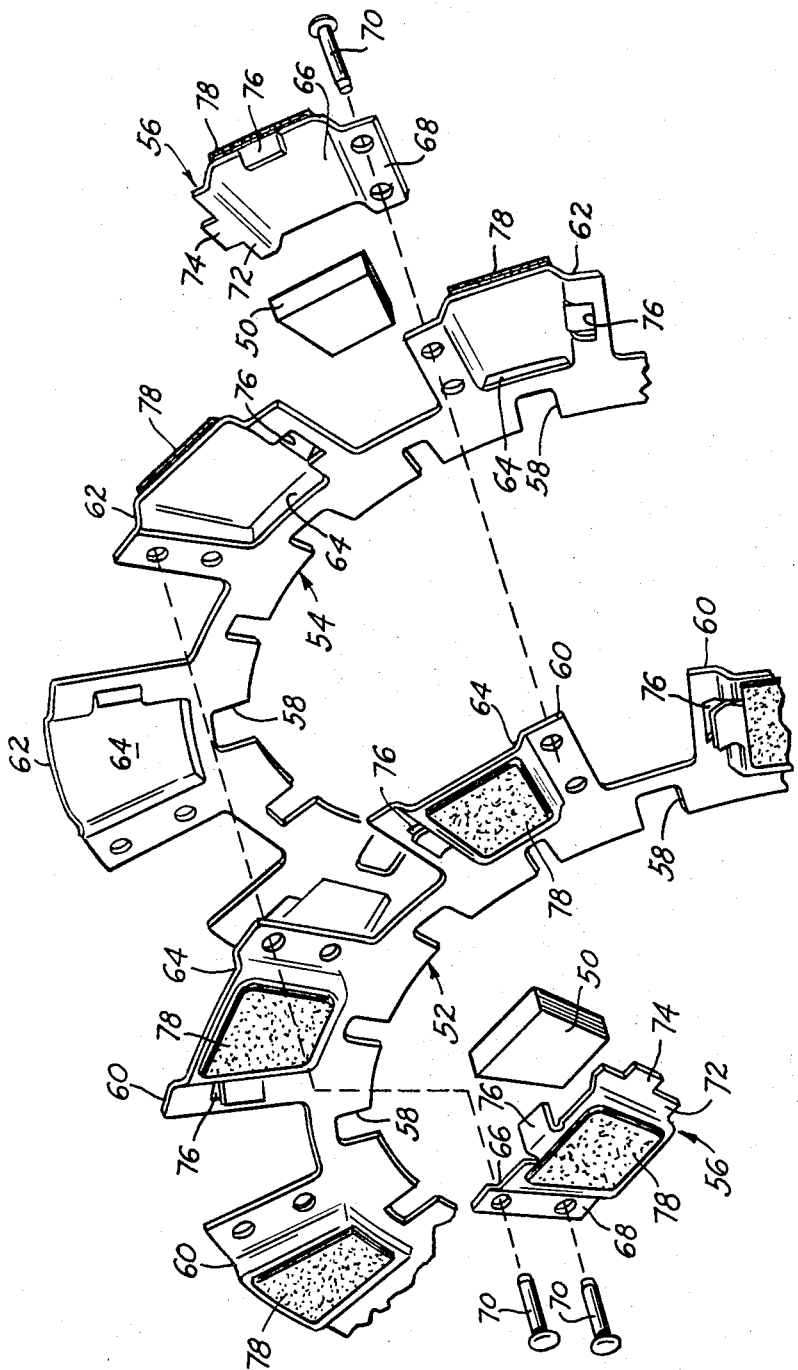

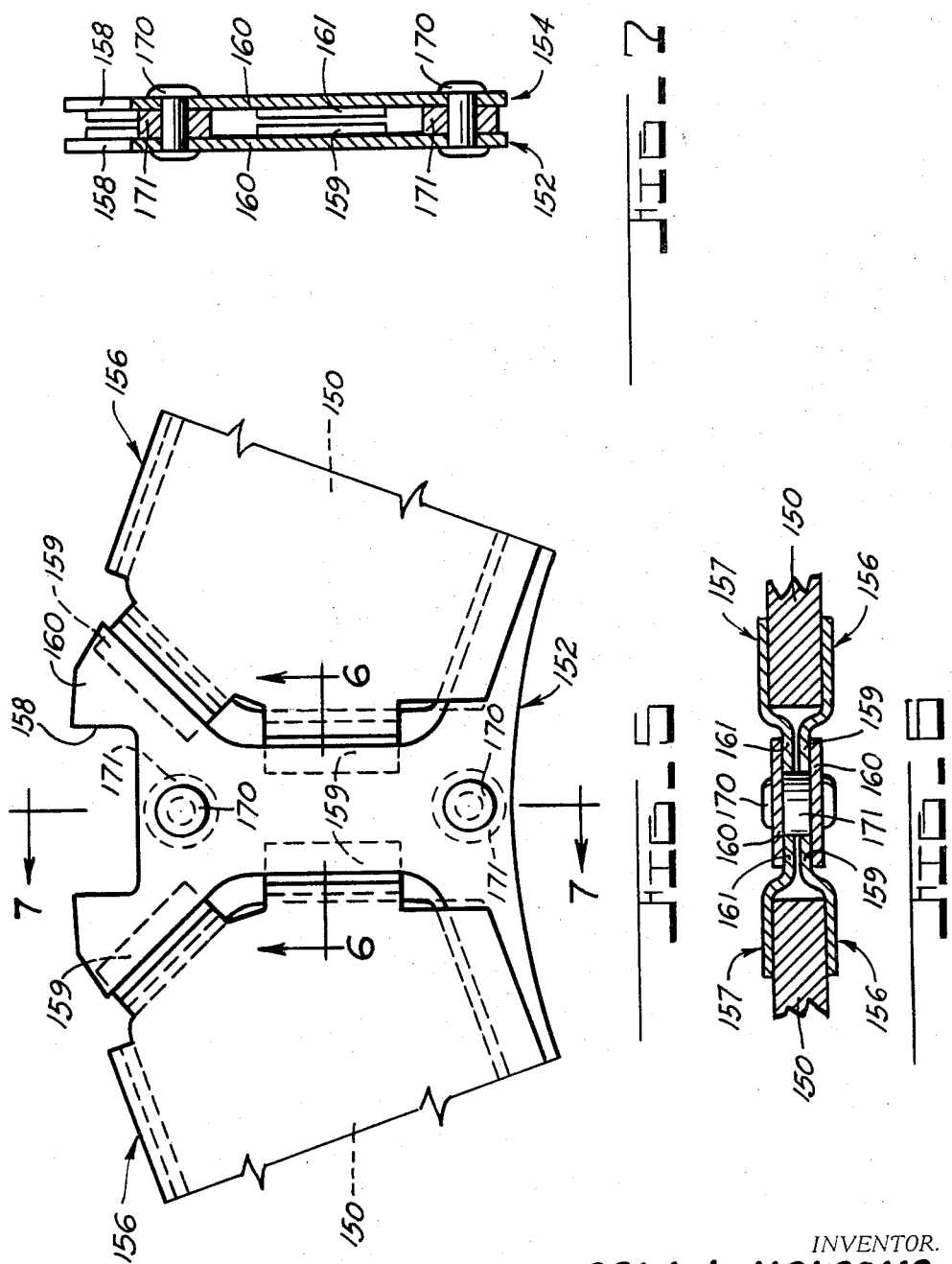

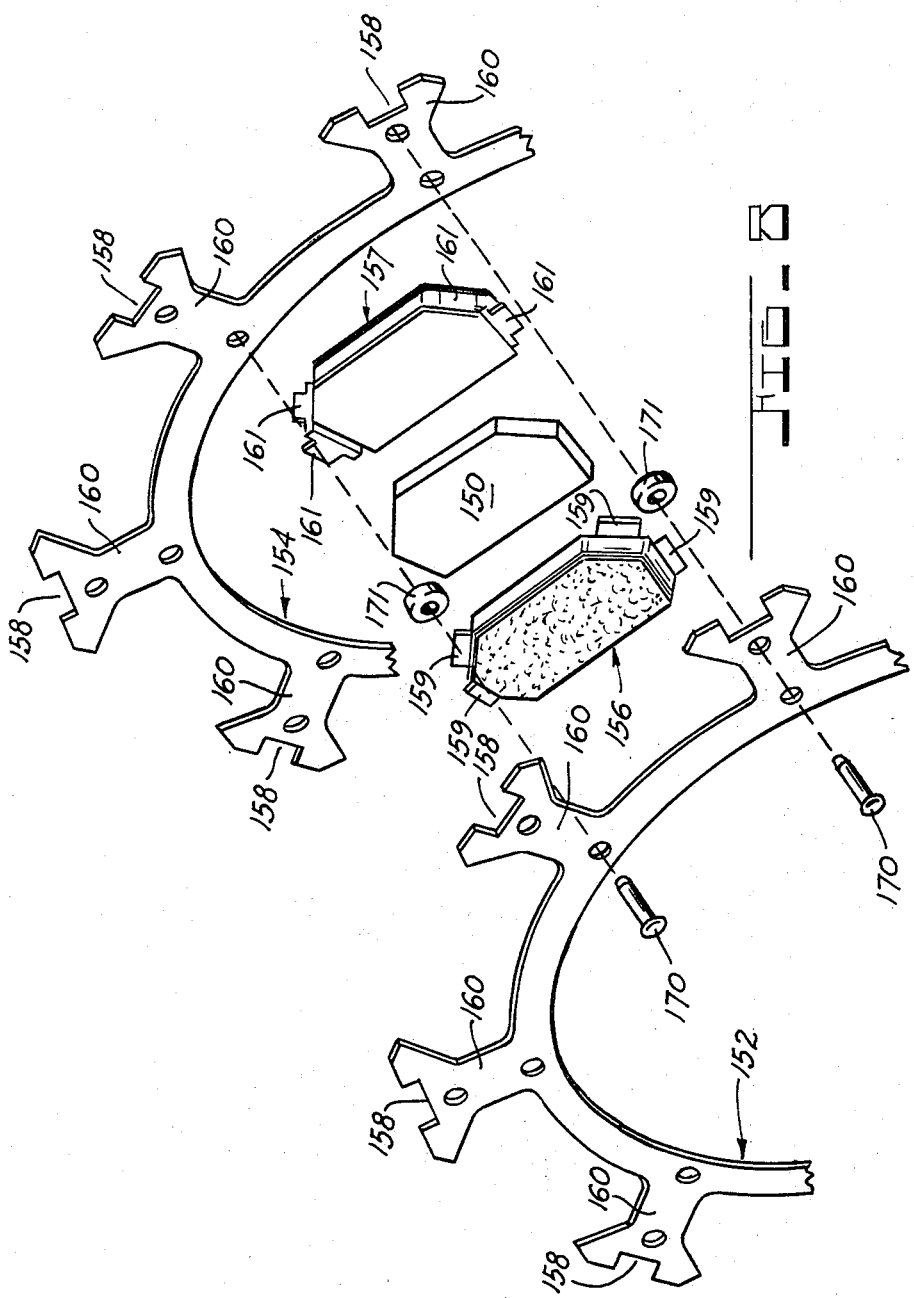

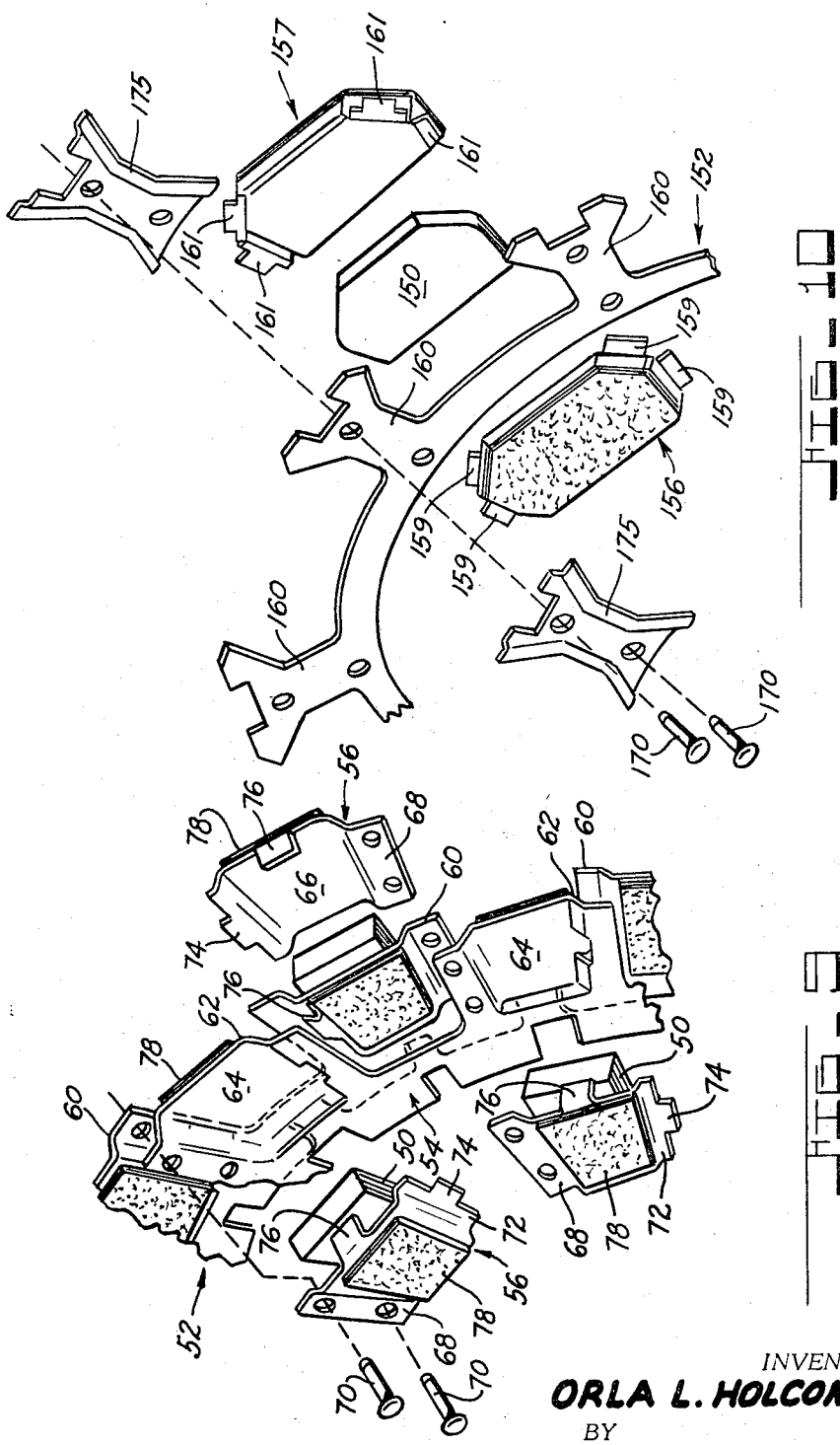

//   # United States Patent Office 3,403,759
Patented Oct. 1, 1968

3,403,759
DISC ELEMENT CONSTRUCTION FOR DISC BRAKE
Orla L. Holcomb, Jr., South Bend, Ind., assignor to The Bendix Corporation, a corporation of Delaware
Filed Feb. 13, 1967, Ser. No. 615,646
20 Claims. (Cl. 188—218)

ABSTRACT OF THE DISCLOSURE

The following relates to a friction disc element construction for a disc brake which incorporates a fully segmented primary heat sink with a partially segmented secondary heat sink. The construction of the disc element is such that structural loading of the primary heat sink, which can be formed of beryllium, is avoided, and differential expansion between the primary heat sink and the structural components of the disc element is permitted.

Background of the invention

Since beryllium is characterized by its high specific heat, low density, and high thermal conductivity, the advantages which would flow from utilizing beryllium as a heat sink material in an aircraft disc brake will be obvious to those skilled in the art. For example, use of beryllium as a brake heat sink would provide a substantial weight reduction over an equivalent steel heat sink brake. Obviously, maximum weight reduction could be provided, if the beryllium heat sink components were utilized structurally so that the components served the dual function of transmitting the frictional forces developed by the braking action and absorbing the thermal energy generated during the stop. In other words, for maximum weight reduction structural usage of beryllium is necessary to perform the functions of current state of the art steel brake rotors and stators. Unfortunately, the structural capabilities of beryllium are relatively poor since the crystal structure thereof does not compare with other classic hexagonal crystal structure metals (i.e., has only four slip planes rather than five). Since this deficiency is difficult to overcome, some sort of structural support for the beryllium is necessary, accordingly. Since the structural usage approach, namely the direct substitution of beryllium for the steel brake components, is unreliable and does not provide for readily reusable components, a non-structural approach is deemed desirable. The non-structural approach would compromise the maximum theoretically possible weight reduction by utilizing steel components to transmit braking loads with the remainder of the heat sink composed of beryllium.

In addition to the low structural capabilities of beryllium, another disadvantage of beryllium is that it cannot be used as a wear surface because the resultant wear debris is in the form of very fine particles of beryllium and beryllium oxide. These particles may be toxic and therefore create a potential health hazard to human beings. A further disadvantage of beryllium is that this material is expensive and thus, heretofore, has been uneconomical for use on an aircraft brake.

Summary of the invention

Accordingly, in view of the foregoing, it is an object of this invention to provide a unique friction disc element having beryllium therein, the construction of which is based on the non-structural approach.

Another object of this invention is to provide a friction disc element construction utilizing beryllium wherein the beryllium is subjected only to compression stresses so as to achieve higher reliability and reusability of the disc element.

A further object of this invention is to provide a friction disc element construction wherein the beryllium utilized therein is in the form of individual solid segments, which are maintained in an annular configuration by a unique encapsulation arrangement, such encapsulation providing for differential expansion between the beryllium and the encapsulating components, and between the encapsulating components, themselves.

A still further object of this invention is to provide a friction disc element construction which permits maximum reusability of the beryllium components, such reuse being accomplished at overhaul locations, such as airline overhaul depots.

More specifically, it is an object of this invention to provide in a wheel and brake assembly having axially extending key-slot type connecting means, a friction disc element comprising a non-structural fully segmented primary heat sink subject only to compressive stresses, said primary heat sink including a plurality of circumferentially arranged segments, and a structural partially segmented secondary heat sink for completely sustaining torque reactions, said secondary heat sink including annular retaining means having a plurality of circumferentially spaced radially extending projections, means formed on said retaining means for slidable engagement with said key-slot type connecting means, and cover plate means secured to said retaining means for forming a plurality of segment containing cavities to contain said segments and for providing a wear surface for said disc element.

Other objects and features of the invention will be apparent from the following description of the mechanism taken in connection with the accompanying drawings.

Brief description of the drawings

FIGURE 1 is a sectional view of a symmetrical wheel and brake assembly which incorporates the invention;

FIGURE 2 is a side elevation of a portion of a symmetrical stator removed from the brake assembly of FIGURE 1;

FIGURE 3 is a sectional view taken along line 3—3 of FIGURE 2;

FIGURE 4 is an exploded perspective view of the stator shown in FIGURES 2 and 3 prior to assembly;

FIGURE 5 is a side elevation of a portion of a symmetrical rotor removed from the brake assembly of FIGURE 1;

FIGURE 6 is a sectional view taken along line 6—6 of FIGURE 5;

FIGURE 7 is a sectional view taken along line 7—7 of FIGURE 5;

FIGURE 8 is an exploded perspective view of the rotor shown in FIGURES 5, 6, and 7 prior to assembly;

FIGURE 9 is an exploded perspective view of another stator embodiment; and

FIGURE 10 is an exploded perspective view of another rotor embodiment.

Description of the preferred embodiments

Referring to FIGURE 1, it will be seen that the wheel and brake assembly which is illustrated includes a wheel 10 rotatably mounted on a stationary axle 12 and a stationary carrier member 14 which is connected to the axle through any suitable means, such as by a direct bolt connection (not shown). The construction for rotatably mounting the wheel 10 to axle 12 and fixing the stationary carrier 14 to the axle 12 is well known, and a detailed description thereof is not deemed to be necessary. The carrier contains a plurality of fluid motors 16, each of which includes a protective sleeve 18 threadedly secured to said carrier and a piston 20 located and slidable in said sleeve. A block of insulating material 22 is secured to the head end of the piston by a threaded pin 24 for protecting the hydraulic brake fluid from the heat generated during braking. The wheel 10, which is formed of two sections fastened together by a plurality of bolts 25, includes a hub portion 26 and a rim portion 28 interconnected by a plurality of spokes 30. A torque tube assembly 32, which includes a sleeve 34 and an annular backing plate flange 36, is fixedly secured to the carrier member 14 by a plurality of circumferentially spaced bolts 38.

The brake which is illustrated is of the disc type and includes a plurality of interleaved rotors 40 which are splined to and are rotated by the aircraft wheel 10, and stators 42 which are splined to sleeve 34 of the torque tube assembly 32. The specific novel construction of the rotors and stators will be described hereafter. Both the rotors and stators are movable axially and are sometimes referred to as a brake "stack." It is the frictional engagement of these relatively rotatable rotors and stators which produces the desired braking action on the aircraft wheel. A pressure plate 44, which is suitably attached to the fluid motors 16, forces the rotors 40 and stators 42 against each other upon activation of the motors by thrusting at one side of the stack and biasing the entire stack against the backing plate 36. Pressure plate 44, each of the rotors 40, each of the stators 42, and the backing plate 36, have friction material lining 46 provided thereon.

Referring to FIGURES 2, 3, and 4 which show the novel detailed construction of each of the stators 42, it will be seen that each stator is comprised of a nonstructural fully segmented primary heat sink which includes a plurality of circumferentially arranged separate beryllium segments 50, and a structural partially segmented secondary heat sink for completely sustaining torque reactions which includes two stamped annular retainers 52 and 54, and a plurality of individual cover plates 56. Other materials having the characteristics of beryllium, particularly a high enthalpy, that is a high heat content per unit mass, would also be suitable for use as the primary heat sink. Each of the annular retainers include a plurality of key slots or notches 58 on the inner periphery thereof which slidably engage axially extending keys preferably formed as integral parts of torque absorbing member 34. In addition, retainer 52 includes a plurality of circumferentially spaced radially extending projections 60, whereas retainer 54 includes a plurality of similar circumferentially spaced radially extending projections 62. Obviously retainers 52 and 54 can be identical, if all key slots 58 thereon are dimensionally the same. It will be noted that when the stator is assembled the annular retainers are placed together so that the projections of each retainer oppose the breaches of the other adjacent retainer. In other words, the projections 60 of the annular retainer 52 are located opposite the spaces formed between the projections 62 of the annular retainer 54, and the projections 62 of the retainer 54 are located opposite the spaces formed between the projections 60 of the retainer 52. Each of the projections 60 and 62 includes a recess 64 for receiving one of the beryllium segments 50, and each of the cover plates 56 likewise includes a recess 66 for receiving one of the beryllium segments. One of the cover plates 56 is suitably secured to each of the projections 60 and 62 of the retainers 52 and 54 in such a manner that the recesses of the projections and associated cover plates form separate cavities, each of which contains one of the beryllium segments. Referring specifically to FIGURE 4 of the drawings, it can be clearly seen that one radially extending edge 68 of each cover plate 56 is rigidly secured through means of rivets 70 to the contacting edges of retainer projections 62 and 64. In other words, each cover plate is riveted to both retainers and to the opposite cover plate containing the adjacent beryllium segment. The other radially extending edge 72 of each cover plate includes a tab 74 extending therefrom which is received by a retaining slot 76 located in the adjacent retainer projection. It will thus be noted that alternate joints, or interfaces are rigidly connected by riveting the sandwich of both retainers between two cover plates, while the complementary joints provide a degree of interface slippage and thermal expansion capability between all components. Such an arrangement prevents the warpage and "locked in" thermal stresses experienced in solid plates. The components are free to translate when subjected to differential temperatures and/or if constructed of materials having dissimilar expansion coefficients. The beryllium segments 50 are retained at the stator periphery by axially extending tabs. Overhaul of the stator is accomplished by replacing the worn steel components which have the lining material 78 attached by any suitable means (mechanical, brazed, flame sprayed, etc.). The beryllium segments can be used over and over again.

Another embodiment of stator 42 is shown in FIGURE 9 wherein like parts are designated by the same numerals. In this embodiment it will be noted that the annular retainers are entwined so that the projection recesses 64 of each retainer extend through the breaches of the opposing retainer. In other words, although essentially the same components are utilized in both the FIGURE 4 and FIGURE 9 embodiments, in the FIGURE 4 embodiment the retainer 52 is sandwiched between retainer 54 and the mating cover plates 56 of retainer 54, whereas in the FIGURE 9 retainer 54 is sandwiched between retainer 52 and the mating cover plates 56 of retainer 54.

In the foregoing two stator embodiments, it will be understood that torque reactions are sustained completely by the structural steel components, whereas the beryllium segments are required to react only to the normal compression forces which are applied to the friction faces. The segment shape is a simple block which does not require any slots, holes, skirts, or brazed attachments. The purpose of such a design it to minimize the probability of damage during refurbishment at overhaul depots and to prevent deformation or crack formation from thermally induced tri-axial stresses. Maximum reusability of the beryllium segments is thus attained.

Referring to FIGURES 5, 6, 7 and 8 which show the novel detailed construction of each of the rotors 40, it will be seen that each rotor is comprised of a non-structural fully segmented primary heat sink which includes a plurality of circumferentially arranged separate beryllium segments 150, and a structural partially segmented secondary heat sink for completely sustaining torque reactions which includes two stamped annular retainers 152 and 154 and a plurality of mating cover plates 156 and 157, for forming a segment containing cavity therebetween. Each of the annular retainers include a plurality of circumferentially spaced radially extending projections 160, each of which includes a key slot or notch 158 on the outer periphery thereof for slidably engaging axially extending driving keys carried by the wheel 10. It will be noted that when the rotor is assembled the annular retainers are placed together so that the projections of each retainer are located opposite each other. It will be noted that cover plate 156 includes tabs 159 extending therefrom which engage the projections 160 of the retainer 152 and that cover plate 157 includes tabs 161 extending therefrom which engage the projections 160 of the retainer 154. A plurality of rivets 170 which extend through the retainer projections rigidly secure the retainers to each other and maintain the mating cover plates with the beryllium segment therein in a properly assembled relation between the projections. A plurality of spacers 171 are located between the retainer projections for determining the desired spaced relationship therebetween. The cover plates or wear caps 156 and 157 may be fabricated with or without friction lining material thereon. Adequate clearances permit three dimensional differential expansion between the beryllium segments, the wear caps, and the spider type retainers. As in the stator, brake actuating forces (compressive forces normal to the friction face) are the only loads imposed upon the primary beryllium heat sink. Torque generated at the friction interface is transmitted to the spider type retainers directly through the wear caps. Refurbishment is accomplished by replacing the wear caps. This is a rivet removal and rerivet process similar to stator overhaul. The major structural elements, the rotor spider type retainers, do not receive major thermal loads and therefore can withstand several tours (brake life between overhauls) of service.

A variation of the foregoing rotor design is shown in FIGURE 10. In this embodiment, wherein like parts are designated by like numerals it will be noted that only a single spider-like retainer 152 is utilized and that suitable retentive or clamping devices are attached to both sides of the retainer projections 160 by rivets 170 to contain the beryllium heat sink segments 150 and mating wear caps 156 and 157. In this variation the tabs 159 or wear cap 156 are located on one side of the retainer projections 160 and the tabs 161 of wear cap 157 are located on the other side of the projections 160. A pair of retainer plates 175, one of which is secured to one side of each projection and the other of which is secured to the other side of each projection maintains the tabs in engagement therewith.

The several practical advantages which flow from this invention are believed to be obvious from the foregoing description, and other advantages may suggest themselves to those who are familiar with the art to which the invention relates.

Furthermore, although this invention has been described in connection with certain specific embodiments, it will be obvious to those skilled in the art that various changes may be made in the form, structure, and arrangement of parts without departing from the spirit of the invention. Accordingly, I do not desire to be limited to the specific embodiments disclosed herein, but instead desire protection falling within the scope of the appended claims.

Having thus described the various features of the invention, what I claim as new and desire to secure by Letters Patent is:

1. In a wheel and brake assembly having axially extending key-slot type connecting means, a friction disc element comprising a nonstructural fully segmented primary heat sink subject only to compressive stresses, said primary heat sink including a plurality of circumferentially arranged segments, and a structural partially segmented secondary heat sink for completely sustaining torque reactions, said secondary heat sink including annular retaining means having a plurality of circumferentially spaced radially extending projections, means formed on said retaining means for slidable engagement with said key-slot type connecting means, and cover plate means secured to said retaining means for forming a plurality of segment containing cavities to contain said segments and for providing a wear surface for said disc element.

2. A friction disc element, as defined in claim 1, wherein said primary heat sink is formed of a material having a high specific heat, high enthalpy content per unit weight and volume, and high thermal conductivity.

3. A friction disc element, as defined in claim 2, wherein said primary heat sink is formed of beryllium and said secondary heat sink is formed of steel.

4. A friction disc element, as defined in claim 1, wherein said cover plate means are fastened to said projections.

5. A friction disc element, as defined in claim 1, wherein said annular retaining means includes first and second adjacent annular retainers, each of which has a plurality of circumferentially spaced radially extending projections.

6. A friction disc element, as defined in claim 5, wherein said first and second retainers are disposed so that the projections of each retainer are located opposite the spaces formed between the projections of the other retainer.

7. A friction disc element, as defined in claim 6, wherein in each projection of said first and second retainers includes a recess for receiving one of said segments.

8. A friction disc element, as defined in claim 7, wherein said cover plate means includes a plurality of cover plates, each of which has a recess for receiving one of said segments, said cover plates being disposed so that one of said plates is secured to each of said projections for forming a segment containing cavity.

9. A friction disc element, as defined in claim 8, wherein a separate cover plate is secured to each of the projections of said first annular retainer and to the adjacent pair of projections of said second annular retainer.

10. A friction disc element, as defined in claim 9, wherein one radially extending edge of each cover plate includes means for rigidly securing said cover plate to a projection on said first annular retainer and to one of said pair of adjacent projections of said second annular retainer.

11. A friction disc element, as defined in claim 10, wherein the other radially extending edge of each cover plate includes a tab extending therefrom, and the other of said pair of adjacent projections of said second annular retainer includes a retaining slot for receiving said tab to thereby provide a degree of interface slippage and thermal expansion capability between said retainers and cover plate.

12. A friction disc element, as defined in claim 11, wherein portions of the adjacent projections of said second annular retainer are sandwiched between portions of the projection of said first annular retainer and the cover plate secured to said projection of said first annular retainer.

13. A friction disc element, as defined in claim 11, wherein portions of the projection of said first annular retainer are sandwiched between portions of the adjacent projections of said second annular retainer and the cover plate secured to said projection of said first annular retainer.

14. A friction disc element, as defined in claim 5, wherein said first and second retainers are disposed so that the projections of each retainer are located opposite each other.

15. A friction disc element, as defined in claim 14, wherein said cover plate means includes a pair of mating cover plates having recess means therein for forming a segment containing cavity, said mating cover plates being located between adjacent pairs of circumferentially spaced projections of each retainer.

16. A friction disc element, as defined in claim 15, wherein one of said cover plates includes tab means located between said retainers for engagement with an adjacent pair of circumferentially spaced projections of said first retainer and the other of said cover plates includes tab means located between said retainers for engagement with an adjacent pair of circumferentially spaced projections of said second retainer, said oppositely disposed projections of said first and second retainers being rigidly secured to each other for urging said mating cover plates towards each other.

17. A friction disc element, as defined in claim 1, wherein said annular retaining means includes at least one annular retainer having a plurality of circumferentially spaced radially extending projections.

18. A friction disc element, as defined in claim 17, wherein said cover plate means includes a pair of mating cover plates having recess means therein for forming a segment containing cavity, said mating cover plates being located between adjacent pairs of circumferentially spaced projections of a retainer and fixedly connected thereto, said connection providing a small amount of clearance to permit three dimensional differential expansion.

19. A friction disc element, as defined in claim 18, wherein each of said mating cover plates includes means for being fixedly secured to said projections, said means including tabs extending from said cover plates, and clamp means secured to said projections for maintaining said tabs in engagement with said projections.

20. A friction disc element, as defined in claim 19, wherein said tabs of one of said mating cover plates are located on one side of said projections, said tabs of the other of said cover plates are located on the other side of said projections, and said clamp means comprises a pair of retainer plates for each projection, one of which is secured to one side of each projection and the other of which is secured to the other side of each projection for maintaining said tabs in engagement with said projections.

References Cited

UNITED STATES PATENTS

| | | |
|---|---|---|
| 2,728,421 | 12/1955 | Butler. |
| 2,893,519 | 7/1959 | Martin. |
| 3,194,347 | 7/1965 | Hall. |

MILTON BUCHLER, *Primary Examiner.*

G. E. A. HALVOSA, *Assistant Examiner.*